United States Patent [19]
Nakamura et al.

[11] Patent Number: 5,183,130
[45] Date of Patent: Feb. 2, 1993

[54] MUFFLER DEVICE FOR MOTORCYCLE

[75] Inventors: Michio Nakamura; Toshihiko Okunosono; Tsuneo Kajikawa, all of Saitama, Japan

[73] Assignee: Honda Giken Kogyo Kabushiki Kaisha, Tokyo, Japan

[21] Appl. No.: 557,078

[22] Filed: Jul. 25, 1990

[30] Foreign Application Priority Data

Jul. 25, 1989 [JP] Japan .................. 1-192263

[51] Int. Cl.$^5$ .................. B60K 11/06; B62D 61/02; F01N 7/14
[52] U.S. Cl. .................. 180/219; 60/320; 180/68.1; 180/68.2; 180/68.3; 180/89.2; 180/229; 180/309; 181/239
[58] Field of Search .............. 180/219, 225, 229, 231, 180/68.1, 68.2, 68.3, 309, 89.2; 60/320, 321; 123/44.11, 41.01; 181/239

[56] References Cited

U.S. PATENT DOCUMENTS

| | | | |
|---|---|---|---|
| 4,632,210 | 12/1986 | Yamamoto et al. | 180/89.2 |
| 4,633,965 | 1/1987 | Tsurumi et al. | 180/68.1 |
| 4,671,781 | 6/1987 | Tanaka et al. | 180/229 |
| 4,699,232 | 10/1987 | Nebu et al. | 180/309 |
| 4,712,629 | 12/1987 | Takahashi et al. | 180/68.1 |
| 4,723,617 | 2/1988 | Kitada | 180/229 |
| 4,733,639 | 3/1988 | Kohyama et al. | 180/229 |
| 4,770,262 | 9/1988 | Yasunaga et al. | 180/229 |
| 4,809,800 | 3/1989 | Suzuki | 180/309 |
| 4,881,614 | 11/1989 | Hoshi et al. | 180/309 |
| 4,903,485 | 2/1990 | Tamba et al. | 60/320 |
| 5,012,883 | 5/1991 | Hiramatsu | 180/219 |

FOREIGN PATENT DOCUMENTS

| | | | |
|---|---|---|---|
| 177718 | 10/1983 | Japan | 180/309 |
| 15624 | 1/1984 | Japan | 180/89.2 |
| 211134 | 9/1986 | Japan | 180/229 |

Primary Examiner—Mitchell J. Hill
Attorney, Agent, or Firm—Lyon & Lyon

[57] ABSTRACT

A motorcycle covered by a cowl includes a power unit comprising an engine and a power transmission device enclosed by a cover within which an engine fan induces cooling air into heat transfer relation with said engine. A muffler device enclosed by the cowl has an air guide cover within which cooling air inducted into the power unit cover is passed thereinto in order to cool the muffler. According to an aspect of the invention the vehicle body frame has a hollow main frame operative to induce a flow of cooling air and for discharging it into cooling relation with the power transmission device.

14 Claims, 15 Drawing Sheets

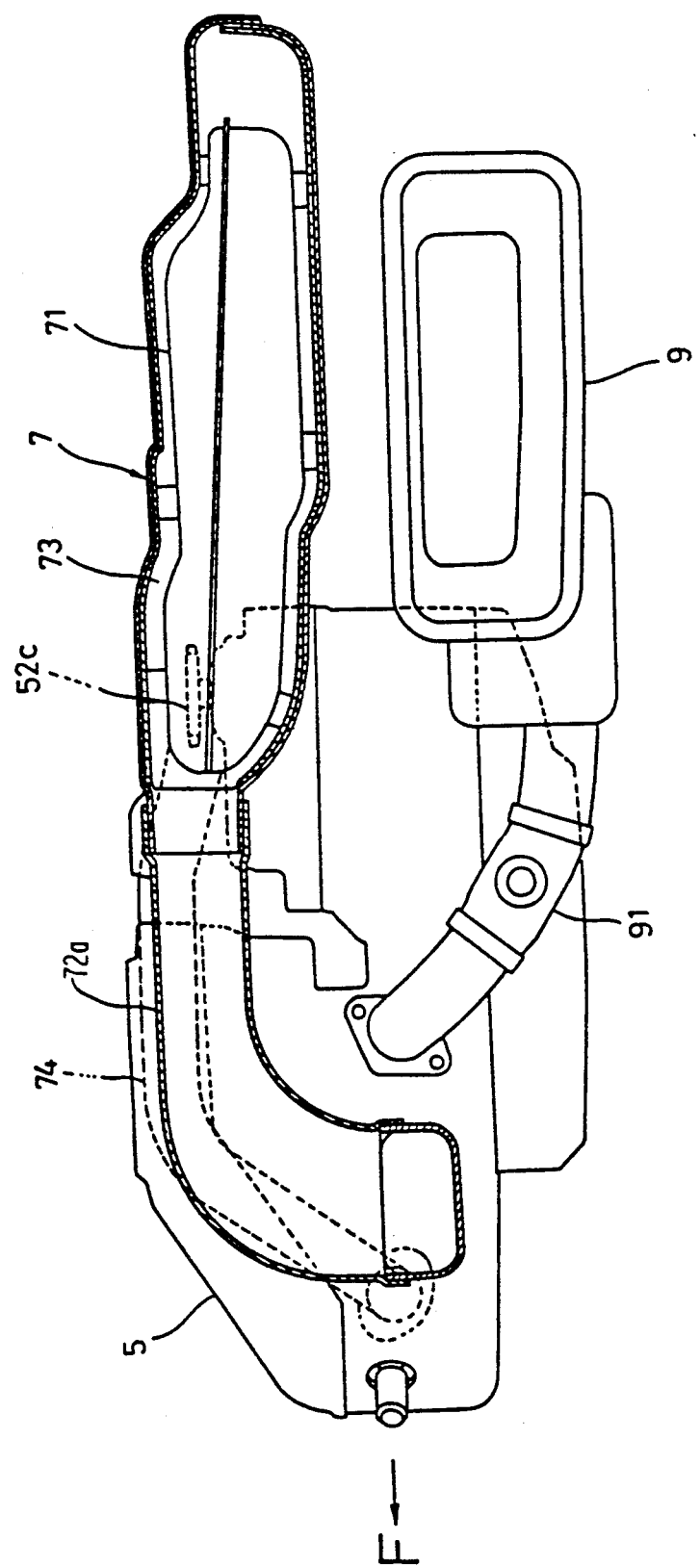

5,183,130

MUFFLER DEVICE FOR MOTORCYCLE

BACKGROUND OF THE INVENTION

In motorcycles of recent design, a part of a vehicle body frame is often covered with a cowl. The muffler bodies of such motorcycles are exposed from the cowl in order to improve their heat radiation properties. As the muffler body is exposed from the cowl, however, some problems arise, such as, for example, that the muffler body may be damaged or deformed by bouncing stones or other debris during running of the motorcycle. Alternatively, the muffler body can become rusted by the deposition thereon of water, such as rainwater. These problems are not readily overcome by locating the muffler body within the cowl because, if the muffler body is located inside the cowl, the possibility of heat dissipated from the muffler body remaining within the cowl becomes a problem.

It is to the solution of these problems, therefore, to which the present invention is directed.

SUMMARY OF THE INVENTION

It is accordingly an object of the present invention to provide a muffler device for a motorcycle in which the muffler body is forcibly cooled by air, thereby allowing the muffler body to be located inside the cowl where damage or deformation of the muffler body can be prevented.

According to the present invention, there is provided a muffler device for a motorcycle including an engine, a vehicle body frame, and a cowl for covering a front portion and right and left side portions of the vehicle body frame, the muffler device comprising a muffler body located inside the cowl and an air guide cover surrounding the muffler body so as to define a cooling chamber between an inner surface of the air guide cover and an outer surface of the muffler body, wherein cooling air is fed into the cooling chamber to forcibly cool the muffler body.

In the muffler device according to the present invention, the air guide cover preferably comprises a pair of half elements.

The muffler device according to the present invention further comprises a tail pipe projecting from the muffler body, the tail pipe being located behind the engine at a central lower position of the vehicle body frame.

The muffler device according to the present invention also includes an exhaust pipe connecting the muffler body to the engine, the exhaust pipe being so located as to pass through a space defined between an engine cooling fan cover and a chain drive sprocket cover behind the fan cover.

According to the present invention constructed as described above, the vehicle body frame includes a hollow main frame, and the motorcycle further includes a power unit including a belt type power transmitting device together with the engine, the muffler body being located on one side of the main frame, the hollow main frame being formed at its front end portion with an air induction hole and being formed at its rear end portion with an air communicating portion for feeding cooling air induced from the air induction hole to the belt type power transmitting device, the air communicating portion being formed on the other side of the main frame opposite the muffler body.

In the device, as described, the muffler body is surrounded by the air guide cover so as to define a cooling chamber therebetween, and cooling air is fed into the cooling chamber to forcibly cool the muffler body. Therefore, exhaust heat dissipated from the muffler body located inside the cowl can be prevented from staying within the cowl. Further, as the muffler body is located inside the cowl, its damage or deformation can be prevented.

Also, as the tail pipe projecting from the muffler body is located behind the engine at a central lower position of the vehicle body frame, staining of the rear fender due to contact with exhaust gas from the tail pipe can be prevented, and a dead space in the cowl can be effectively utilized.

Furthermore, with the exhaust pipe being so located as to pass through the space defined between the engine cooling fan cover and the chain drive sprocket cover, more dead space in the cowl can be effectively utilized without widening the vehicle body.

Moreover, as the air communicating portion of the main frame is formed on the opposite side of the muffler body with respect to the main frame, the air communicating portion can be easily connected to the belt type power transmitting device without being hindered by the muffler body. Even in the case where a rubber tube is used for the connection of the air communicating portion to the belt type power transmitting device, there is no possibility that the rubber tube will be adversely affected by the exhaust heat from the muffler body.

These and other objects and features of the present invention will be understood from the following description with reference to the accompanying drawings.

BRIEF DESCRIPTION OF THE DRAWINGS

FIG. 15 is a top plan view, partly in section of the power unit and the muffler;

DETAILED DESCRIPTION OF A PREFERRED EMBODIMENT OF THE INVENTION

Figure 1:
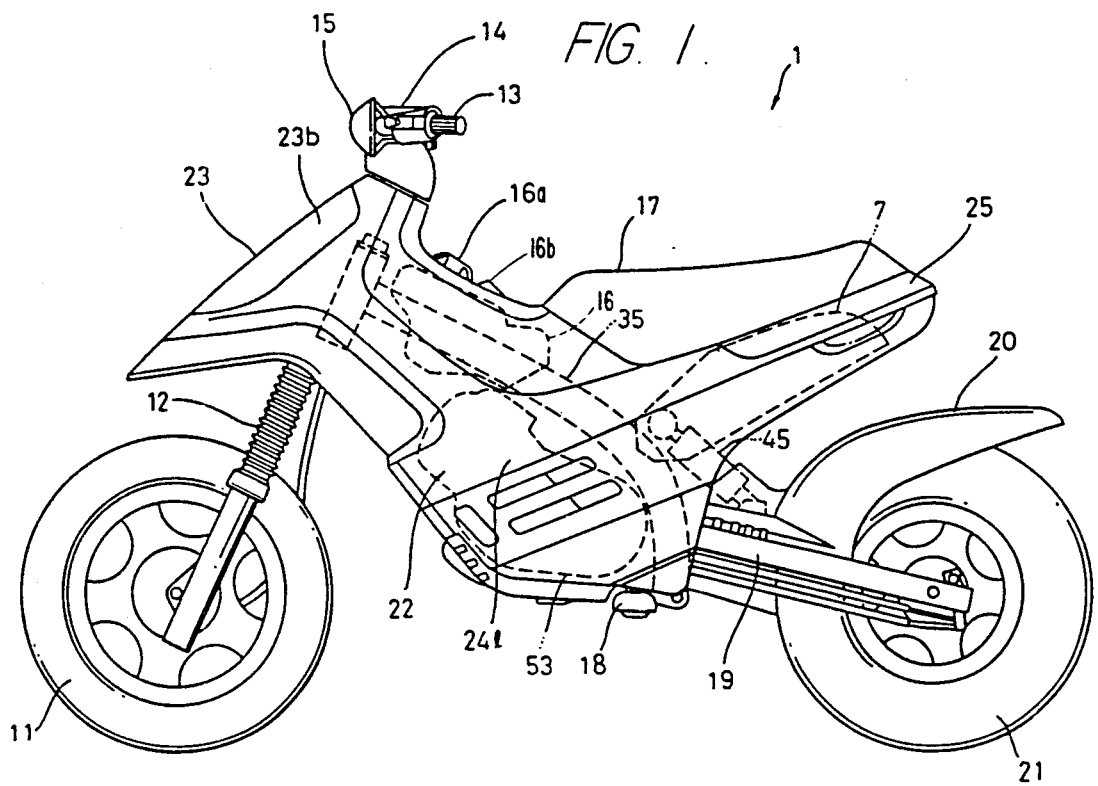
FIG. 1 is a left side elevational view of a motorcycle embodying the present invention.
Figure 2:
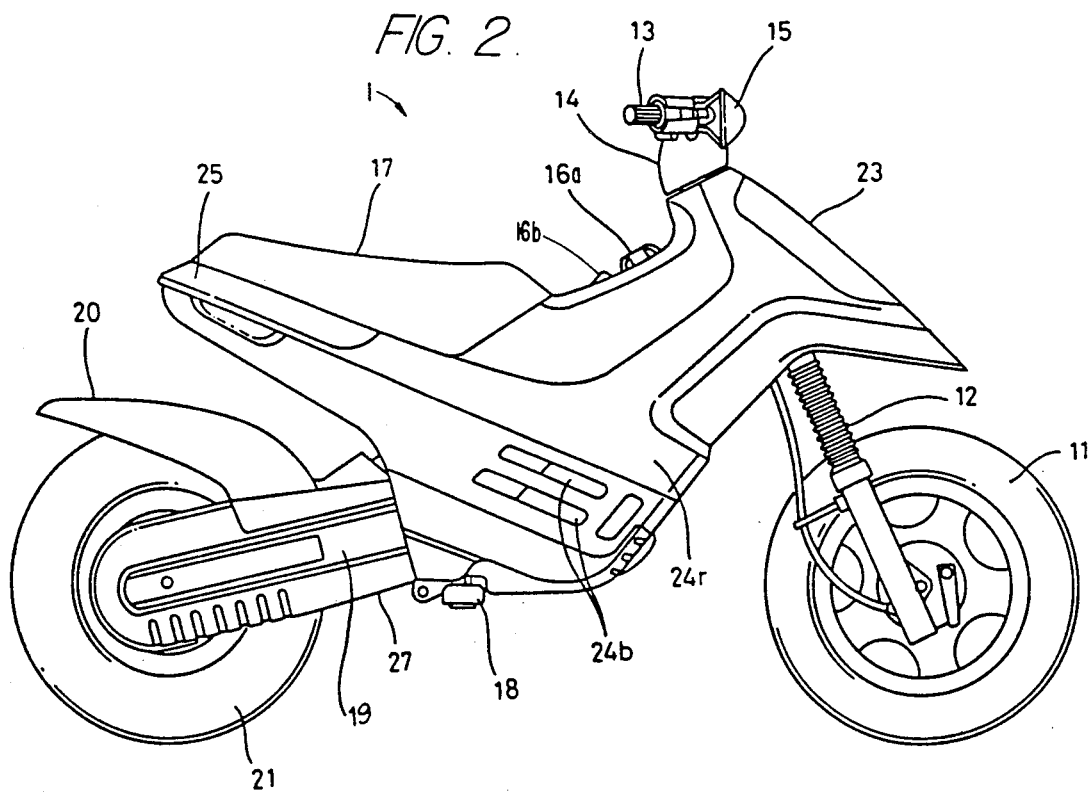
FIG. 2 is a right side elevational view of the motorcycle of FIG. 1.
Figure 3:
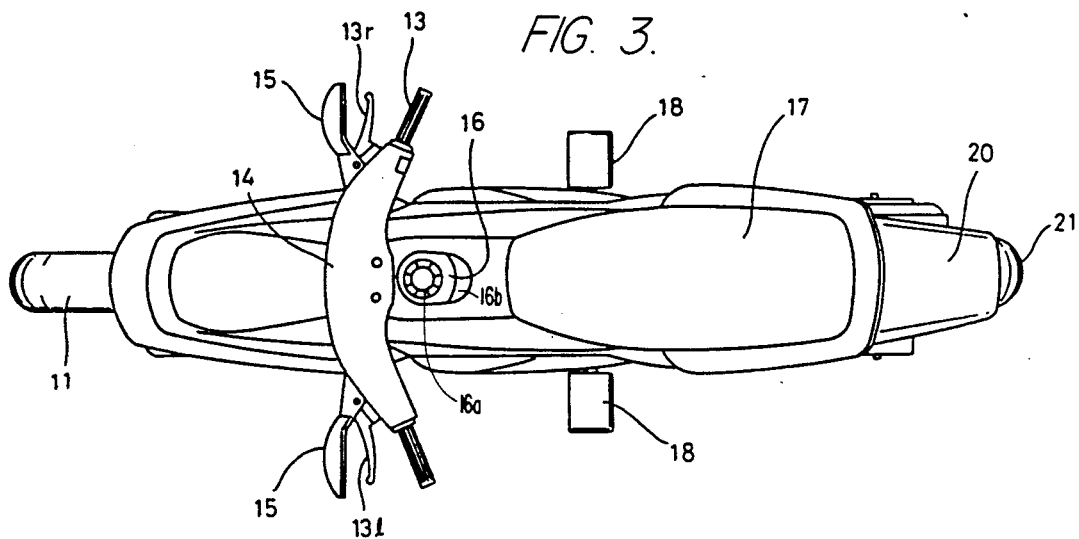
FIG. 3 is a top plan view of the motorcycle of FIG. 1.
Figure 4:
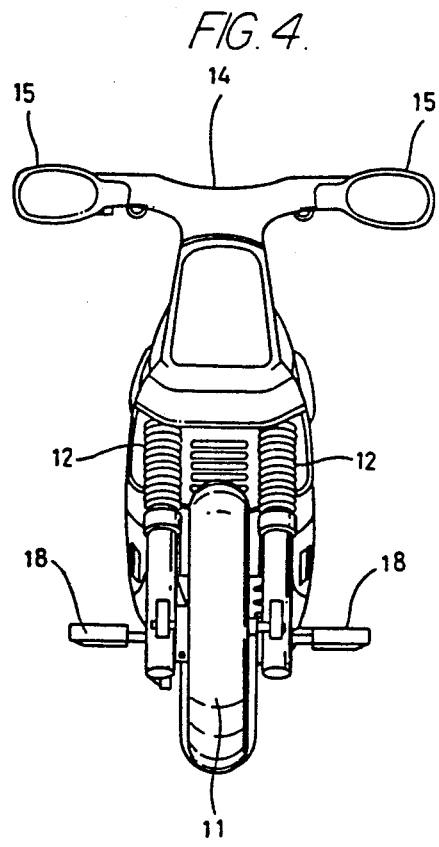
FIGS. 4 and 5 are front and rear elevational views, respectively, of the motorcycle of FIG. 1.
Figure 5:
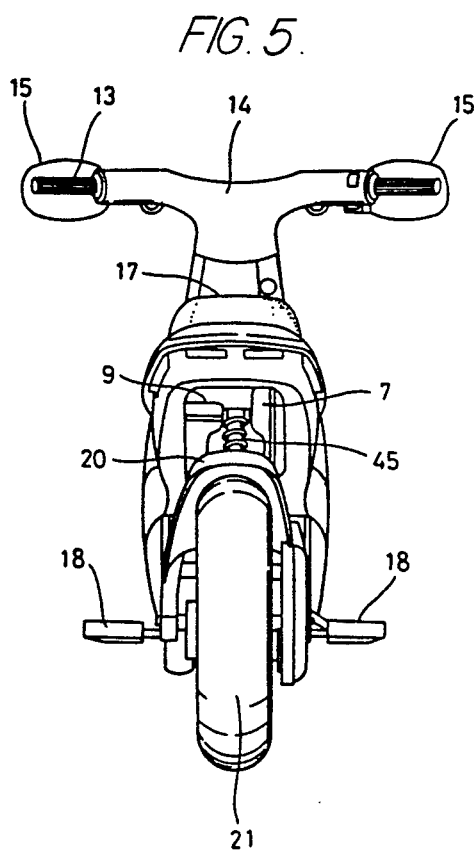

Referring to FIGS. 1 to 5, the motorcycle 1 includes a front wheel 11, front suspension 12, steering handle 13, front brake lever 13r, rear brake lever 13l, handle cover 14, right and left knuckle guards 15, fuel tank 16 including a 16a cap and a cap guard 16b, seat 17, right and left foot rests 18, rear fork 19, chain case 27, rear fender 20, and rear wheel 21. Further, the motorcycle 1 is provided with a cowl 22 comprised of a front cowl portion 23, right and left side cowl portions 24r and 24l, and rear cowl portion 25. The front cowl portion 23 is formed with a luggage box 23b. The right side cowl portion 24r is formed with cooling air induction holes 24b for inducing an outside air.

Figure 6:
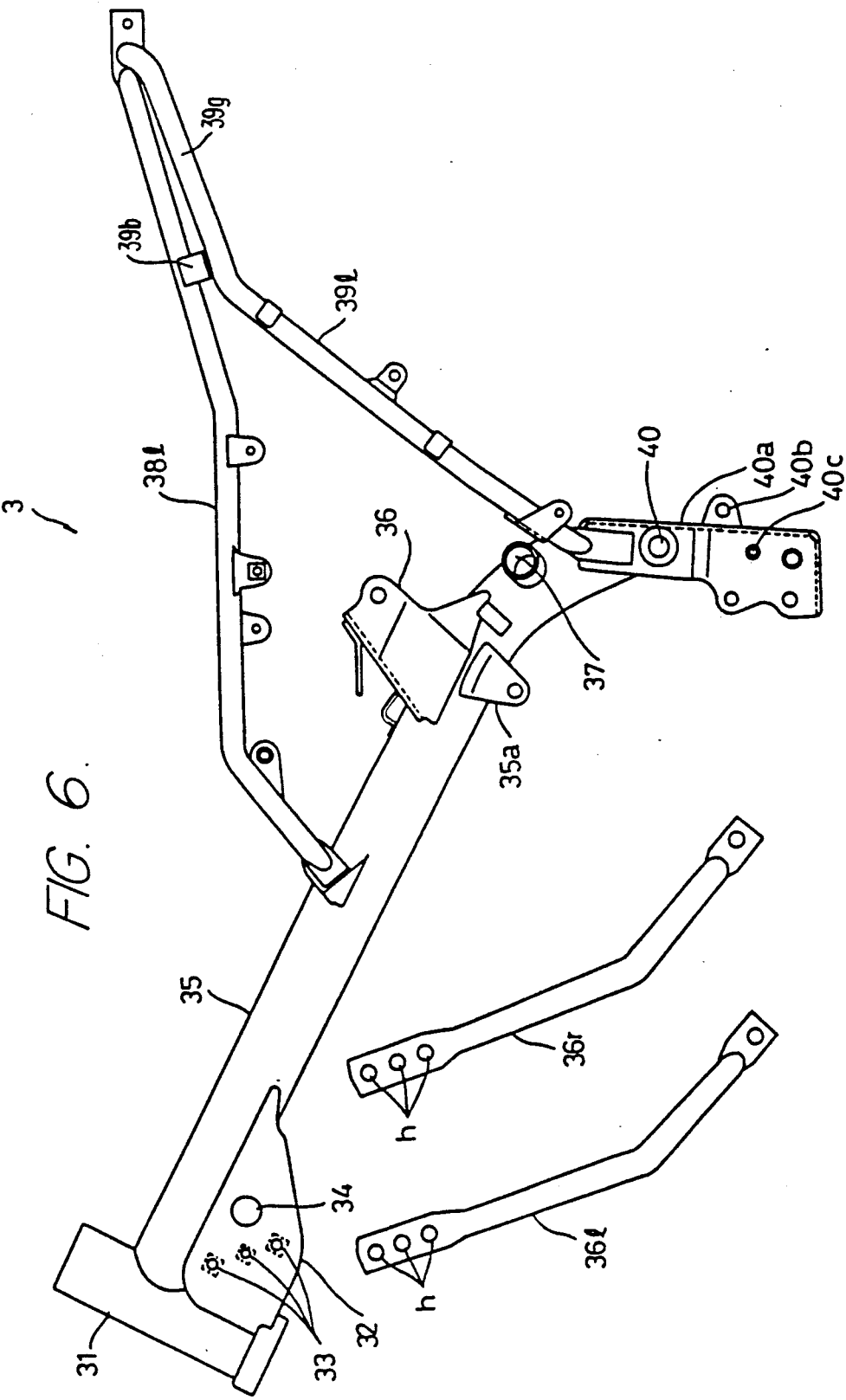
FIG. 6 is a side elevational view of the vehicle body frame.
Figure 7:
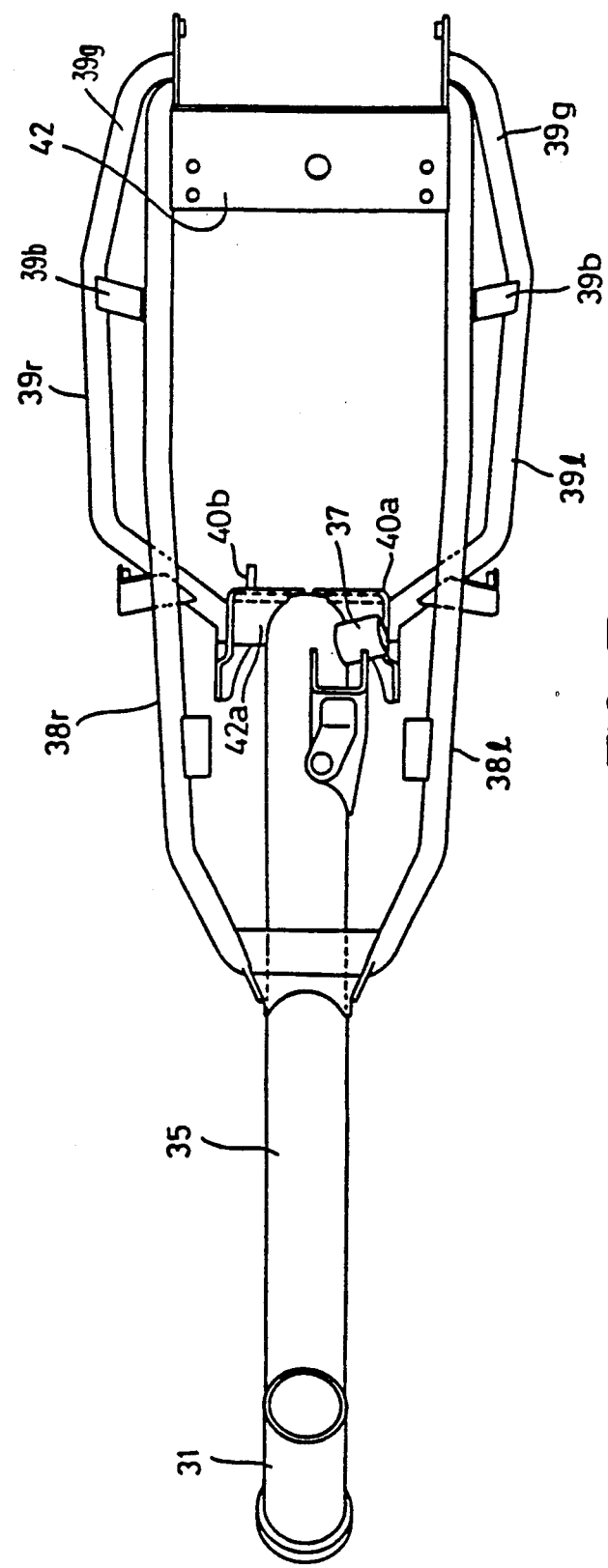
FIG. 7 is a top plan view of the vehicle body frame of FIG. 6.
Figure 11:
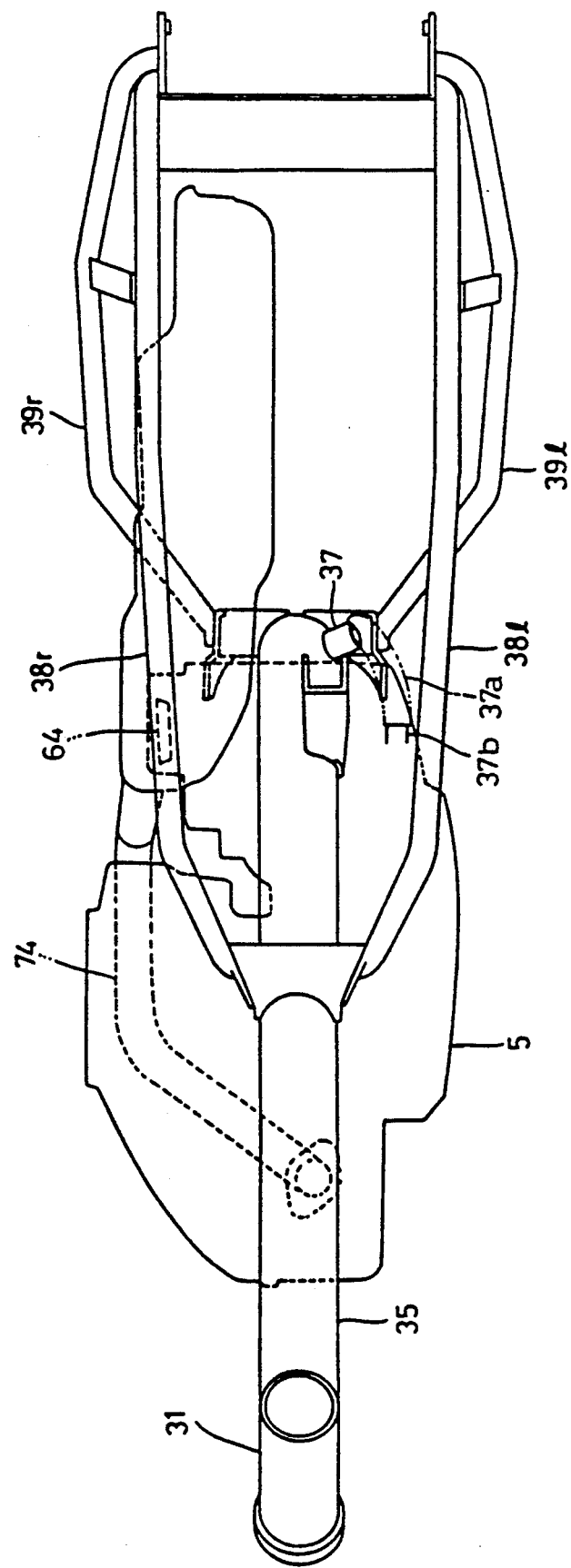
FIG. 11 is a top plan view of the exhaust system of the present invention as installed in the vehicle body frame.

A vehicle body frame 3 (see FIGS. 6 to 8) is surrounded at its side periphery by the cowl 22. The vehicle body frame 3 includes a head tube 31, a hollow main frame 35 extending rearwardly from the head tube 31 and extending obliquely downwardly, a pair of right and left seat frames 38r and 38l extending right and left from the main frame 31 at its mid position and extending rearwardly, and a pair of right and left rear down frames 39r and 39l connecting rear ends of the right and left seat frames 38r and 38l with opposite ends of a cross member 42a welded to a lower end of the main frame 35. A pivot plate 40a is provided outside the cross member 42a. The pivot plate 40a is formed with two mount holes 40b and 40c for mounting a spark arrester 76 to be hereinafter described. A pair of right and left gusset members 32 are welded to a connecting portion between the head tube and the main frame 35. The gusset members 32 are formed with a plurality of mount holes 33 for mounting a pair of right and left front down frames 36r and 36l, and are also formed with a pair of right and left cooling air induction holes 34 that communicate with an inside space of the main frame 35. Each of the front down frames 36r and 36l, is formed at its upper end portion with a plurality of mount holes h to be aligned to the mount holes 33 of each gusset member 32. The main frame 35 is formed at its rear end portion with a cooling air outlet 37 as an air communicating portion projecting leftwardly, so that the outside air induced from the cooling air induction holes 34 is fed through the interior space of the main frame 35 to the cooling air outlet 37. As will be hereinafter described, the cooling air outlet 37 is connected through a rubber tube 37a to an air inlet 37b leading into a power transmitting chamber T (see FIGS. 11 and 12), so as to cool a belt type power transmitting device 54 provided in the power transmitting chamber T. The main frame 35 is provided with a bracket 36 for pivotably supporting one end of a rear suspension 45, at a position just forwardly of the cooling air outlet 37. The pivot plate 40a is further formed at its right and left wall portions with a pair of right and left mount holes 40 for mounting a rear fork pivot 41. As shown in FIG. 7, a cross member 42 is provided to connect the rear ends of the right and left seat frames 38r and 38l. A pair of right and left reinforcing plates 39b are provided to connect the right seat frame 38r with the right rear down frame 39r and also connect the left seat frame 38l with the left rear down frame 39l. A rear portion of each of the right and left rear down frames 39r and 39l is formed as a grip pipe portion 39g.

Figure 8:
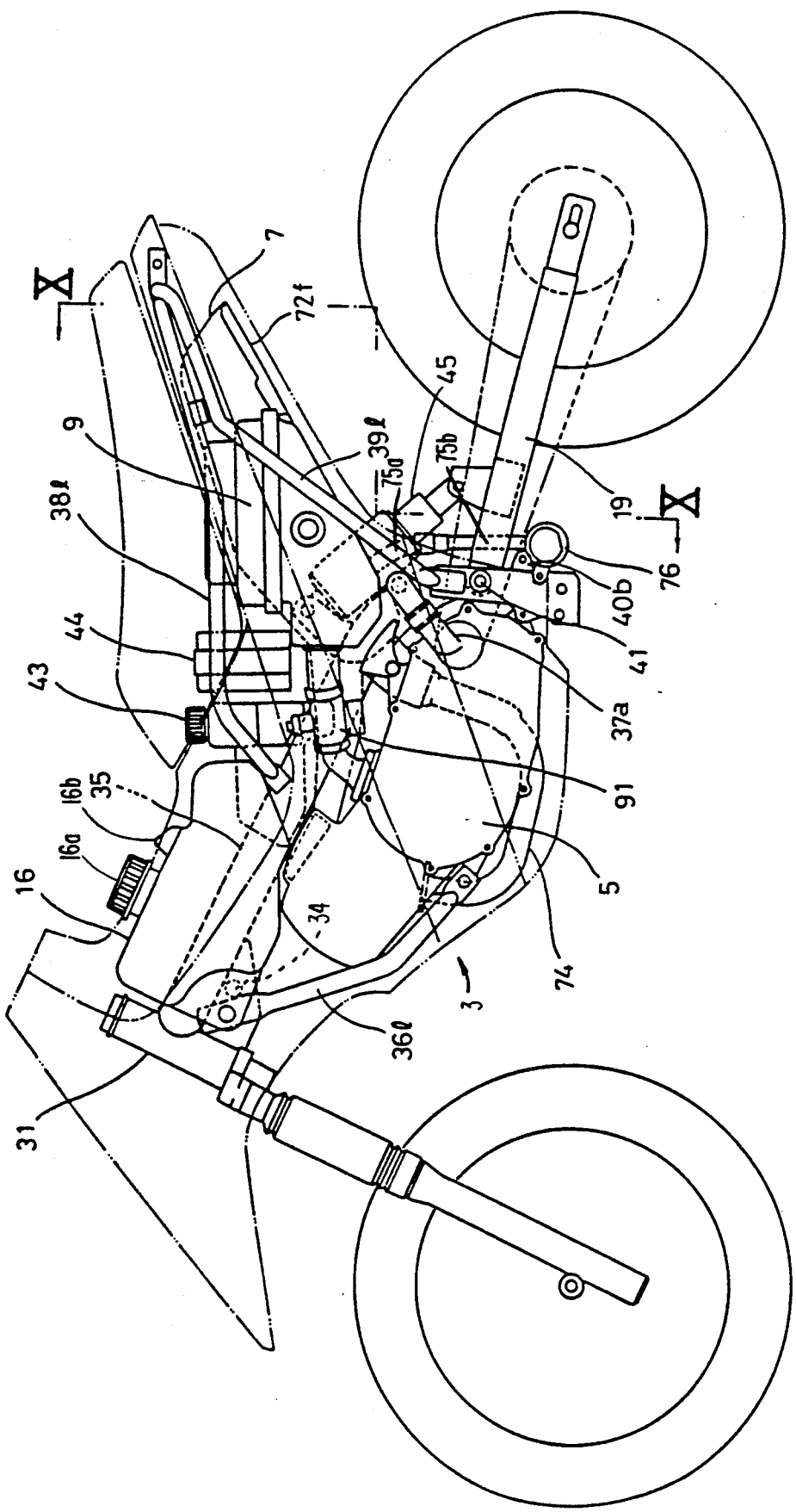
FIG. 8 is a side elevational view of the motorcycle of FIG. 1 with the cowl removed.
Figure 9:
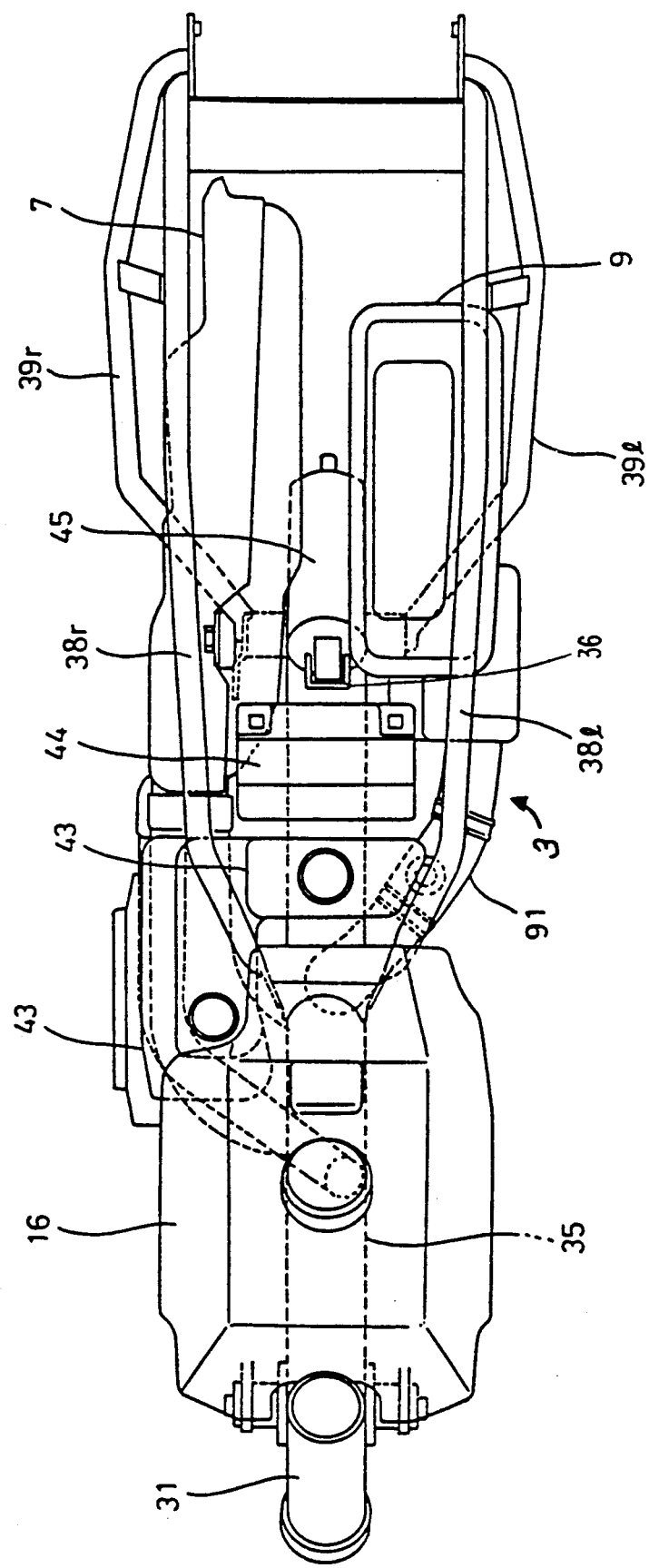
FIG. 9 is a top plan view of the motorcycle as shown in FIG. 8.
Figure 10:
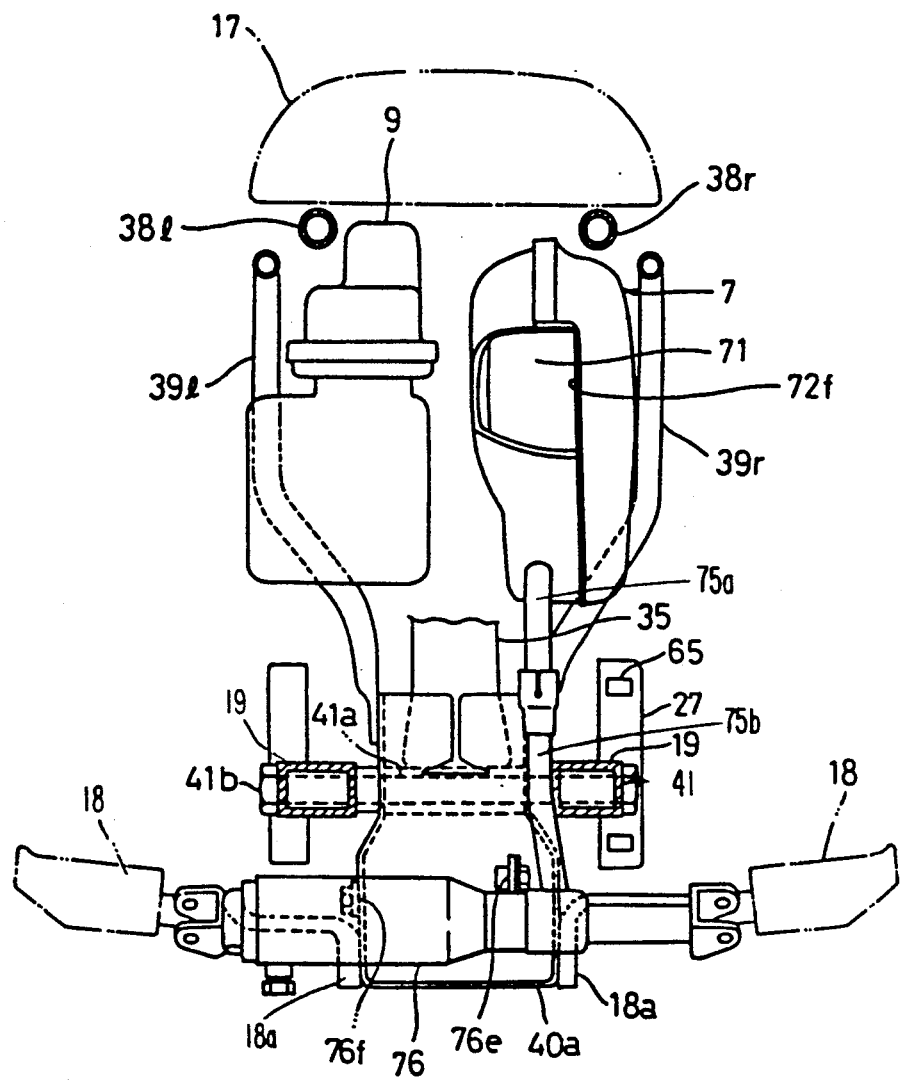
FIG. 10 is a cross-sectional view taken along line X—X of FIG. 8.

As shown in FIGS. 8 to 10, the rear forks 19 are pivotably supported at their front ends to the rear fork pivot 41 mounted to the mount holes 40 of the pivot plate 40a fixed through the cross member 42a to the main frame 35. A power unit 5 is suspendedly mounted to a bracket 35a (FIG. 6) projecting downwardly from the main frame 35. Rear ends of the right and left down frames 36r and 36l are connected to the power unit 5 at its front lower portion, thereby maintaining the integrity of the power unit 5. The fuel tank 16 is supported on the main frame 35 at a position forwardly of and above the power unit 5. An oil tank 43 is located just behind the fuel tank 16. As shown in FIG. 9, the oil tank 43 has an L-shaped configuration, as viewed in plan, such that it extends adjacent the rear and right sides of the fuel tank 16. A battery 44 is located just behind the oil tank 43.

As best shown in FIG. 10, a suction system of the power unit 5 is located on the left side with respect to a center line extending in the longitudinal direction of the vehicle body. The suction system includes an air cleaner 9 and a carburetor 91 connected thereto. An exhaust system of the power unit 5 is located on the right side with respect to the center line. The exhaust system includes a muffler 7 located in opposed relationship to the air cleaner 9. The power unit 5 is connected through an exhaust pipe 74 to the muffler 7. The spark arrester 76 is provided with two brackets 76e and 76f to be mounted to the pivot plate 40a at the mount holes 40b and 40c thereof. A tail pipe 75a extending downwardly from the muffler 7 is located just behind the rear fork pivot 41, and is connected to a connecting pipe 75b extending upwardly from the spark arrester 76.

As also shown in FIG. 10, the rear fork pivot 41 is comprised of a pivot shaft 41a and a nut 41b threadedly engaged with the pivot shaft 41a. The right and left foot rests 18 are mounted through a pair of right and left brackets 18a to the vehicle body frame 3.

Figure 12:
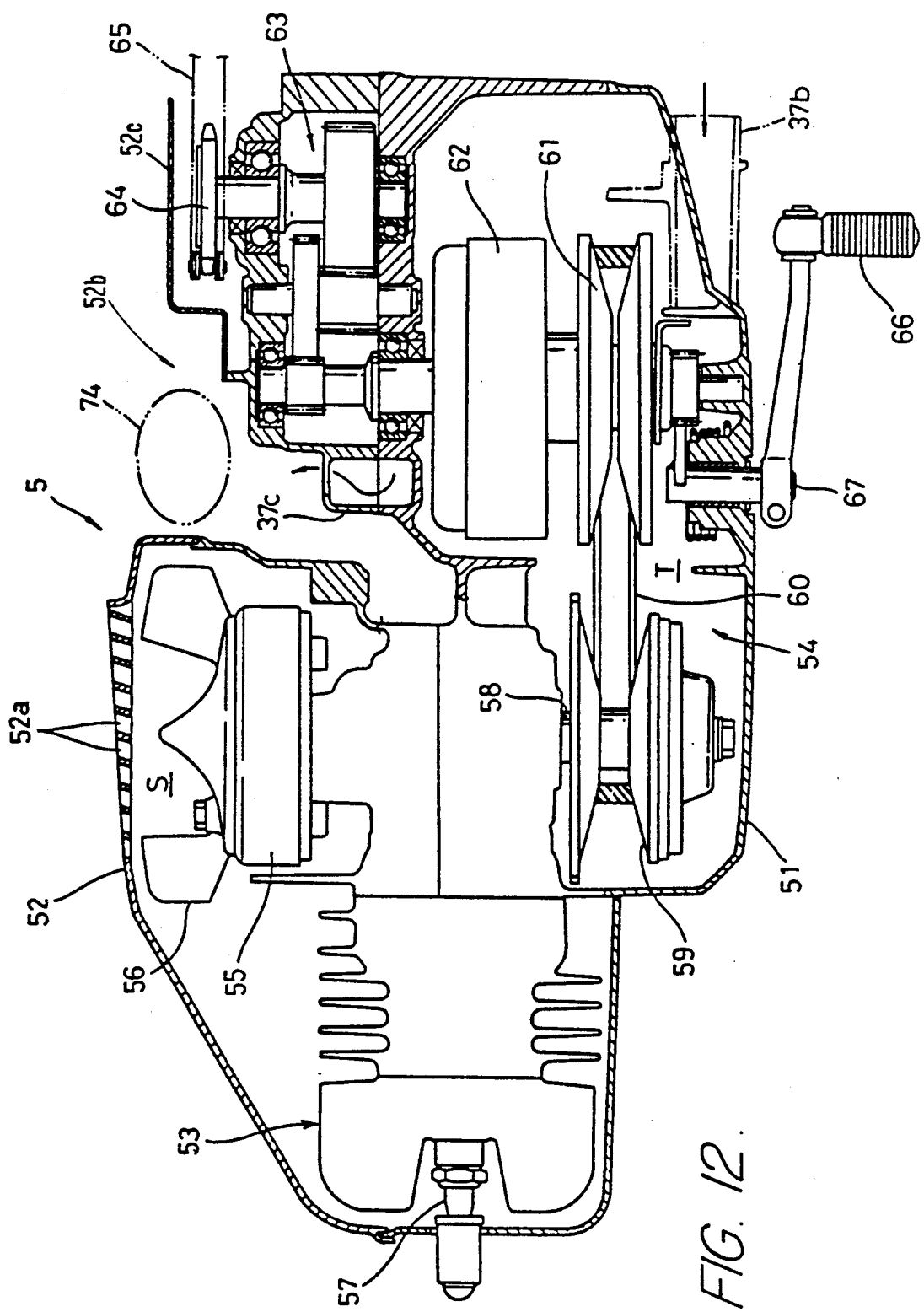
FIG. 12 is a horizontal sectional view of the power unit of the motorcycle of FIG. 1.

Referring to FIG. 12, an arrow F designates a travelling direction of the motorcycle 1. The power unit 5 is surrounded by a power unit cover 51. An engine 53 is located inside the power unit cover 51. A crankshaft 58 extends right and left from the engine 53. A cooling fan 56 is mounted on a right end portion of the crankshaft 58. The cooling fan 56 is exposed within a forced air cooling chamber S defined by the fan cover 52 connected to the power unit cover 51. A drive pulley 59 of a belt-type power transmitting device 54 disposed in the power transmitting chamber T is mounted on a left end portion of the crankshaft 58. A power transmitting belt 60 is wrapped around the drive pulley 59 and a driven pulley 61. Thus, driving power of the engine 53 is transmitted through the power transmitting belt 60 to a transmission 63. Rotational speed of the engine 53 is reduced by the transmission 63, and the engine power at such reduced speed is then transmitted through a chain drive sprocket 64 and a chain 65 to the rear wheel 21.

As mentioned previously, the cooling air outlet 37 of the main frame 35 is connected through the rubber tube 37a to the air inlet 37b of the power unit cover 51, so that cooling air from the cooling air outlet 37 is fed through the rubber tube 37a into the power transmitting chamber T, thus cooling the belt drive transmitting device 54.

The fan cover 52 covering the cooling fan 56 is formed with an air induction hole 52a. In FIG. 12, reference numeral 57 designates an ignition plug, 55 a fly wheel, 66 a kick pedal, 67 a kick shaft, and 62 a clutch.

Figure 13:
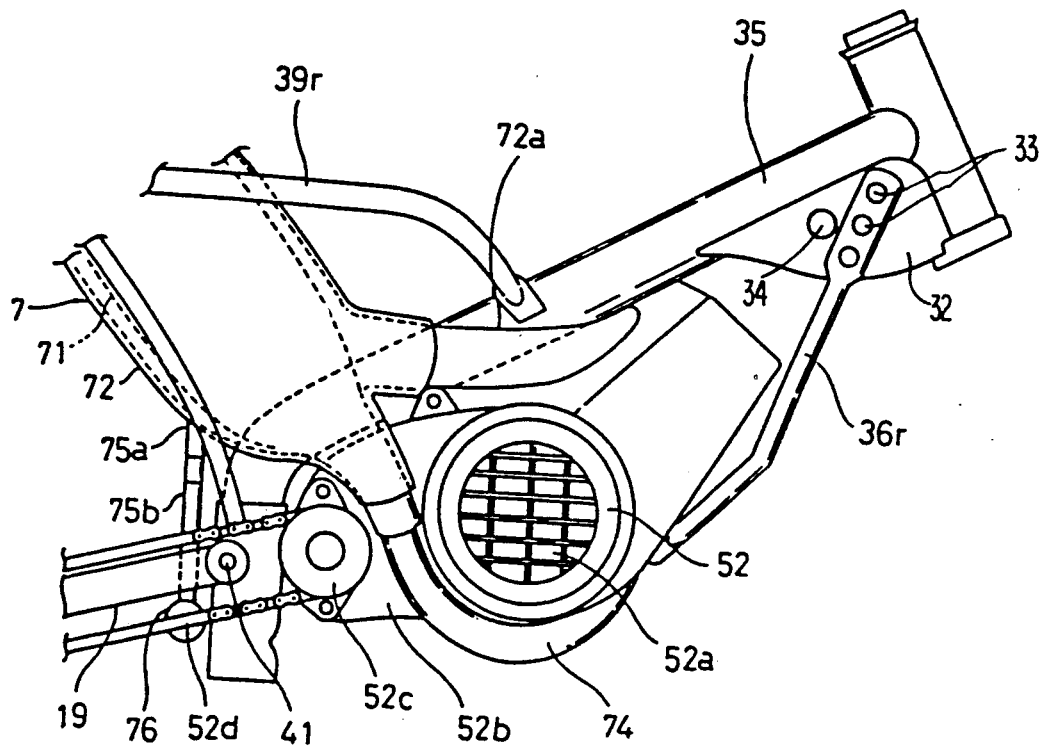
FIG. 13 is a side elevational view of the fan cover of the motorcycle of FIG. 1.

As shown in FIG. 13, the exhaust pipe 74 is so located as to pass through a space 52b defined between the fan cover 52 and chain drive sprocket cover 52c for covering the chain drive sprocket 64, thus effectively utilizing a dead space in the cowl 22. The exhaust pipe 74 is connected at its rear end to a muffler body 71 surrounded by air guide cover 72. Thus, the muffler 7, which is described with particular reference to FIGS. 16 to 23, is constructed of the muffler body 71 and the air guide cover 72.

Figure 16:
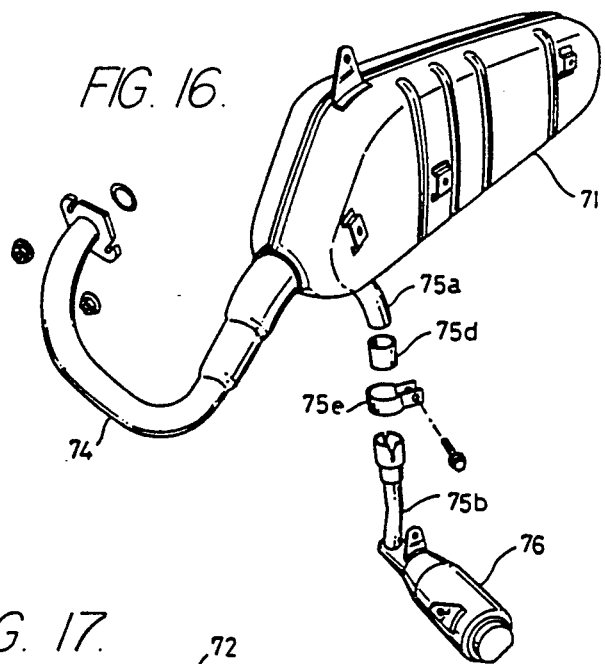
FIG. 16 is an exploded perspective view of the muffler body and related parts.
Figure 20:
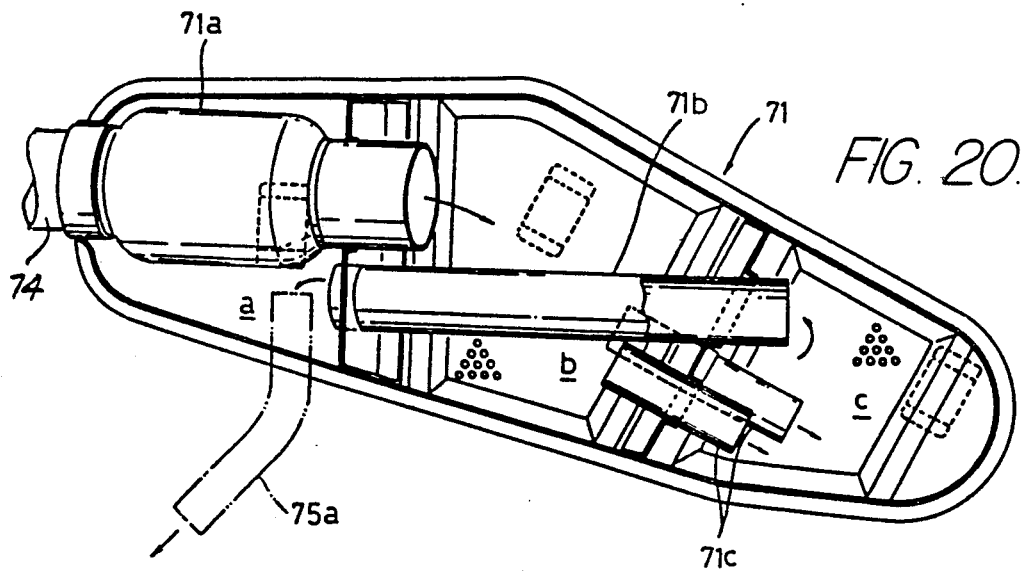
FIG. 20 is a vertical sectional view of the muffler body.
Figure 21:
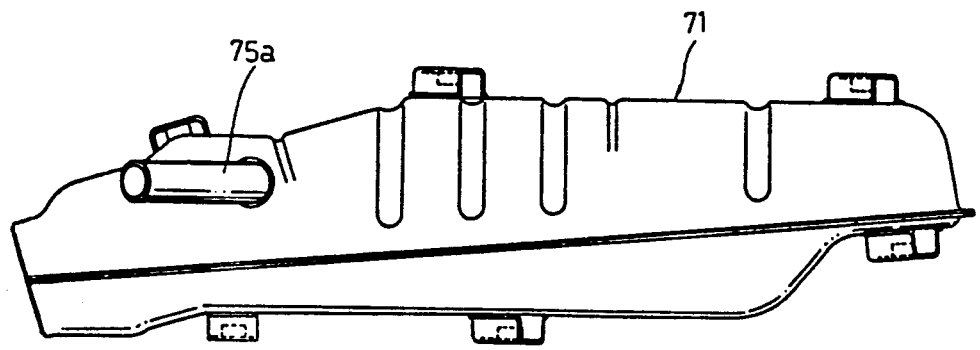
FIG. 21 is a bottom plan view of the muffler body.
Figure 22:
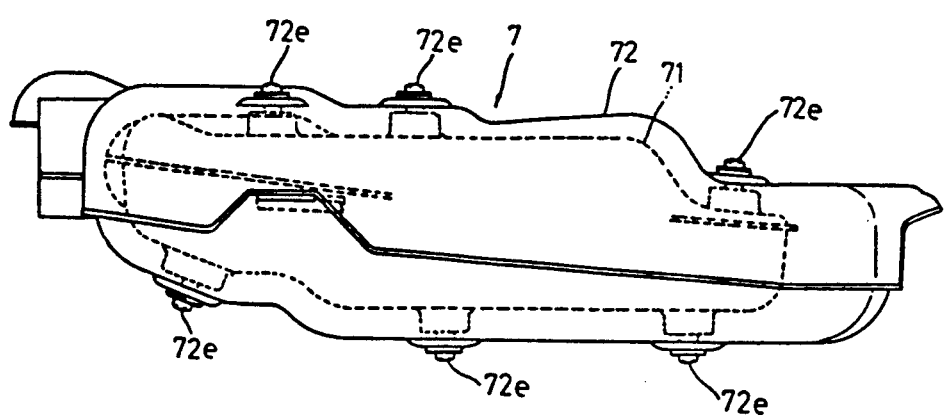
FIG. 22 is a top plan view of the muffler body.
Figure 25:
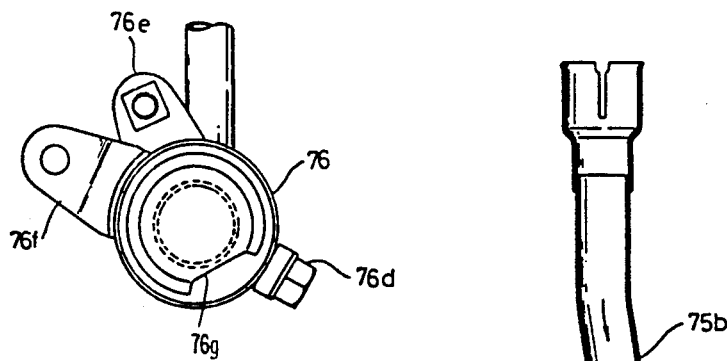
FIG. 25 is a left side elevational view of the spark arrester.

As shown in FIG. 20, a plurality of expansion chambers a, b and c are defined in the muffler body 71. The expansion chamber b communicates at its front end through a connecting pipe 71a with the exhaust pipe 74, and also communicates at its rear end through two connecting pipes 71c with the expansion chamber c. The expansion chamber c communicates through a connecting pipe 71b with the expansion chamber a. The tail pipe 75a communicates with the expansion chamber a. Thus, exhaust gas flowing from the exhaust pipe 74 into the muffler body 71 is repeatedly expanded and contracted in the course of flowing from the expansion chamber b through the expansion chamber g to the expansion chamber a, thereby reducing exhaust noise. The exhaust gas from the tail pipe 75a of the muffler body 71 is discharged through the spark arrester 76 to the outside. As shown in FIG. 16, the connecting pipe 75b of the spark arrester 76 is connected through a muffler packing 75d and a muffler band 75e to the tail pipe 75a of the muffler body 71.

Figure 24:
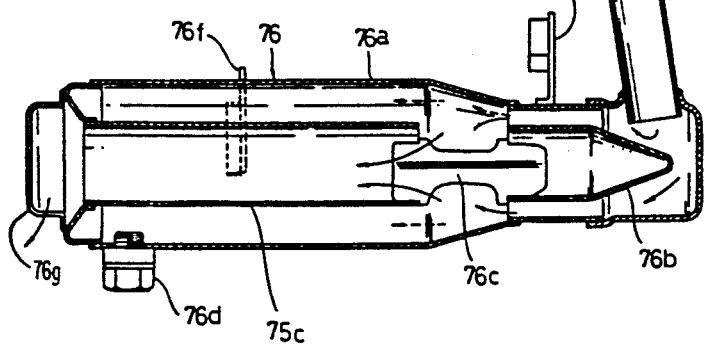
FIG. 24 is a vertical sectional view of the spark arrester.
Figure 26:
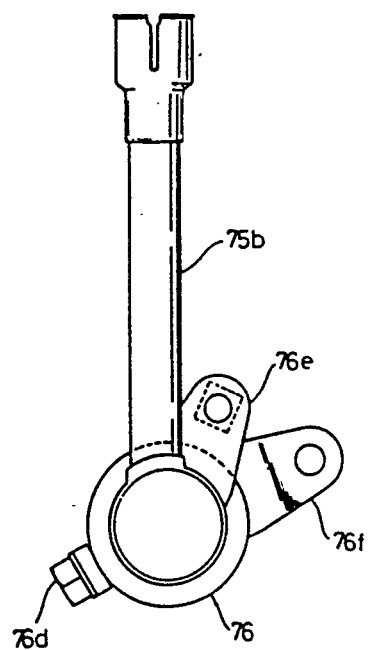
FIG. 26 is a right side elevational view of the spark arrester.
Figure 23:
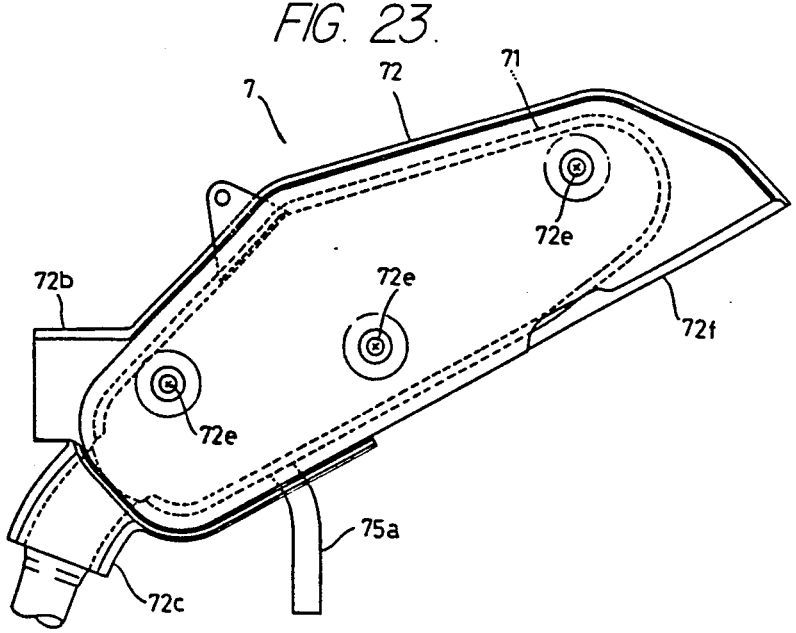
FIG. 23 is a side elevational view of the muffler body.

Any exhaust gas containing a spark flowing from the tail pipe 75a of the muffler body 71 through the connecting pipe 75b into the spark arrester 76 is diffused by a diffuser member 76b (FIG. 24), and is thereby separated from the spark. The spark is fed into an annular space defined between an outer arrester body 76a and an inner tail pipe 75c, as shown by a dashed arrow, while the exhaust gas separated from the spark is fed into the tail pipe 75c, as shown by a solid arrow, and is then discharged from an outlet 76g. Reference numeral 76d designates a plug for removing carbon gathered in the annular space, and reference numeral 76c designates a guide piece for guiding the exhaust gas into the tail pipe 75c after it is diffused by the diffuser member 76b.

As described above with reference to FIGS. 8 and 10, the tail pipe 75a is located behind the engine 53 at a central lower position of the vehicle body frame 3. Accordingly, a dead space inside the cowl 22 can be effectively utilized, and deformation of the tail pipe 75a due to a collision of a bouncing stone or other debris from the outside can be prevented.

Figure 17:
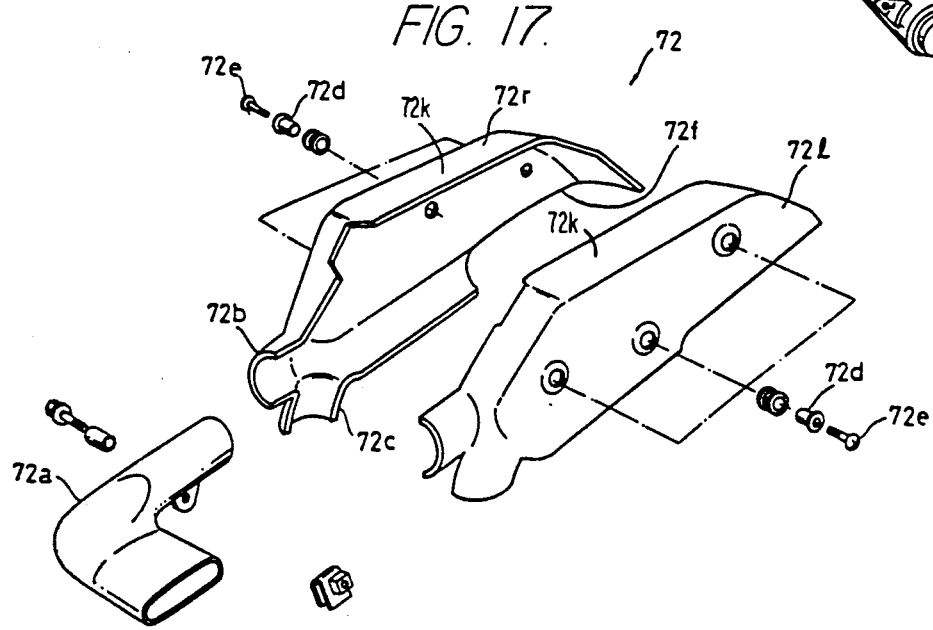
FIG. 17 is an exploded perspective view of the air guide cover.
Figure 18:
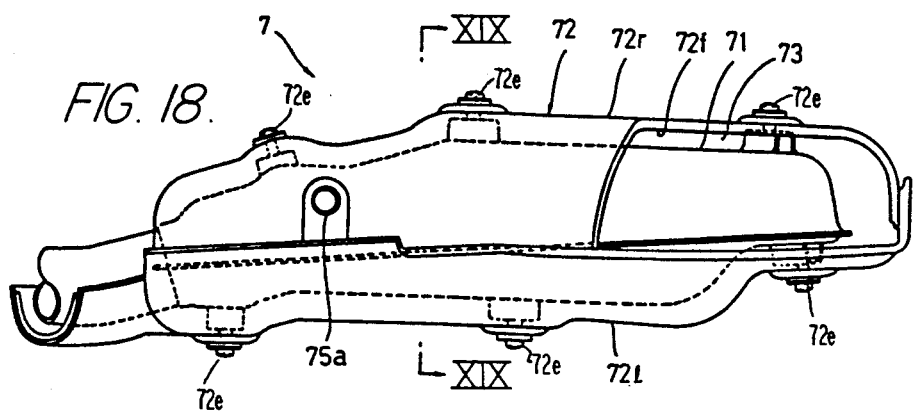
FIG. 18 is a bottom plan view of the muffler device.

Referring to FIG. 17, an air guide cover 72 serves as a heat guard and is formed of molded glass wool. It is comprised of a right half element 72r and a left half element 72l. Right and left portions of the muffler body 71 are covered with the right and left half elements 72r and 72l, respectively, with a given spacing defined between the muffler body portions and the cover elements. The right and left half elements 72r and 72l of the air guide cover are fixedly connected to the muffler body 71 through a plurality of air guide collars 72d and screws 72e. Thus, a cooling chamber 73 allowing flow of cooling air is defined between the outer surface of the muffler body 71 and the inner surface of the air guide cover 72, as shown in the drawing figures. The air guide cover 72 is formed at its front end portion with a mount portion 72c for mounting the exhaust pipe 74 and a mount portion 72b for mounting a rear end of a heat guard duct 72a for inducing cooling air into the cooling chamber 73. Further, the air guide cover 72 is formed at its rear end portion with an air outlet 72f (FIG. 14) opening downwardly to the outside.

Figure 14:
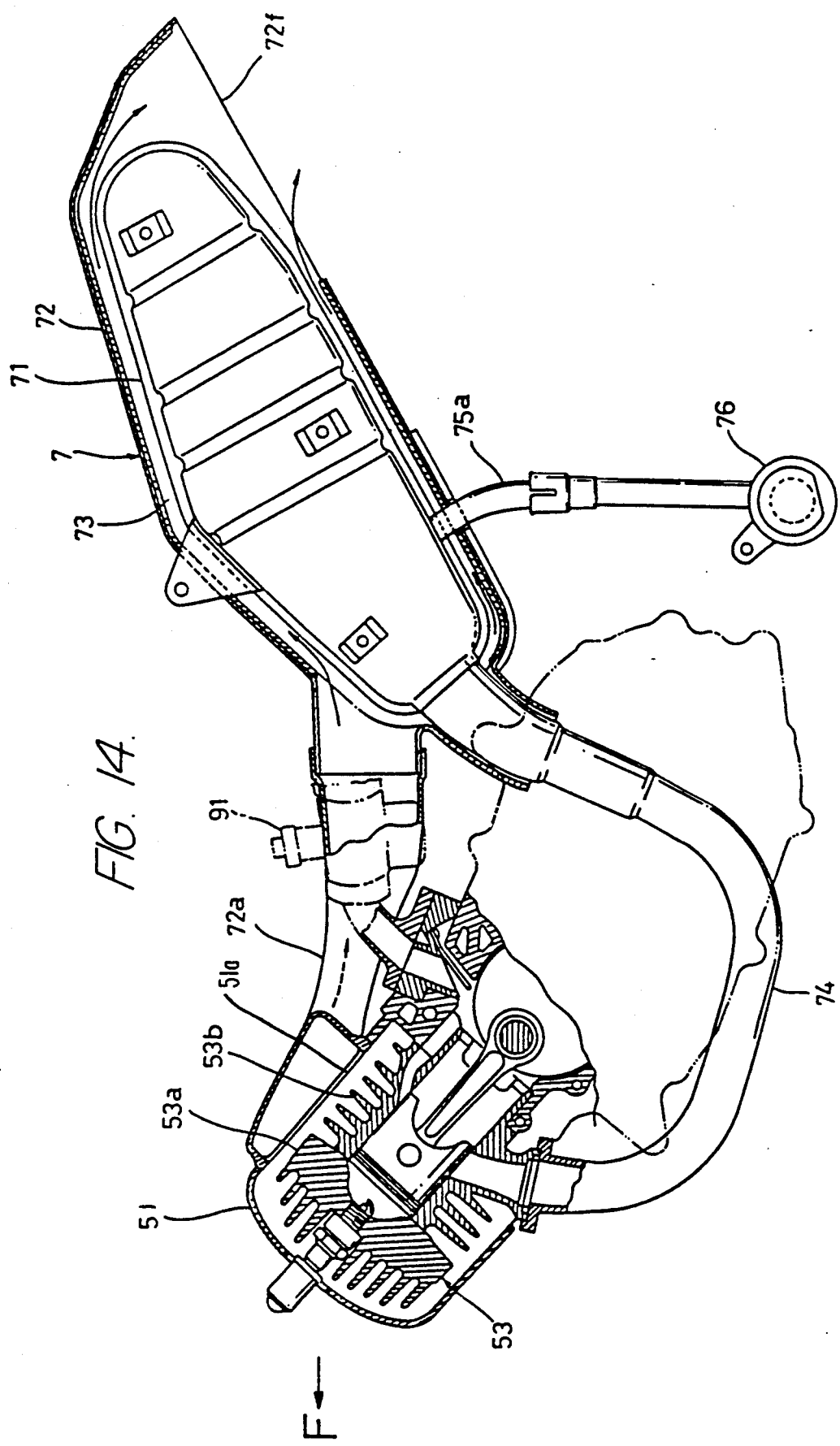
FIG. 14 is a partial side sectional elevational view of the power unit and the muffler.

As shown in FIG. 14, the heat guard duct 72 is connected at its front end to a right side surface of the power unit cover 51 so as to be exposed to a right portion of the engine 53. In FIG. 14, reference numerals 53a and 53b designate a cylinder head and a cylinder block of the engine 53, respectively.

Figure 19:
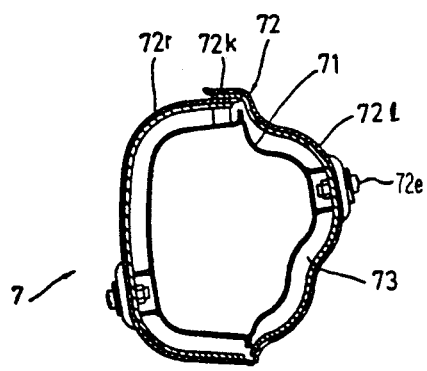
FIG. 19 is a cross sectional view taken along line XIX—XIX of FIG. 18.

In operation, cooling air induced from the air induction hole 52a of the fan cover 52 by the cooling fan 56 operates to first cool the cylinder block 53b and the cylinder head 53a of the engine 53. Then, the cooling air is fed via an opening 51a in the power unit cover through the heat guard duct 72a into the cooling chamber 73 to thereby cool the muffler body 71. Finally, the cooling air is discharged from the air outlet 72f of the air guide cover 72. In this manner, as the muffler body 71 is cooled by the forced cooling air used for cooling the engine 53 whose flow is inducted by the cooling fan 56, exhaust heat dissipated from the muffler body 71 is prevented from staying within the cowl 22 in spite of the fact that the muffler body 71 is disposed therein. Further, as the right half element 72r and the left half element 72l of the air guide cover 72 are connected together through upper overlapping portions 72k, as shown in FIGS. 17 and 19, a high sealing performance can be obtained.

Further, as described above, the power unit 5 including the belt type power transmitting device 54 is mounted below the main frame 35 of the vehicle body frame 3, and the muffler body 71 is located on one side of the main frame 35. The air induction holes 34 are formed at the front end portion of the main frame 35, and the air communicating portion 37 for introducing a cooling air to the belt type power transmitting device 54 is formed at the rear end portion of the main frame 35 on the other side of the main frame 35 opposite the muffler body 71. Accordingly, the connection of the air communicating portion 37 to the belt type power transmitting device 54 can be easily carried out. Further, the rubber tube 37a connecting the air communicating portion 37 to the belt type power transmitting device 54 is less influenced by the heat dissipated from the muffler body 71. As mentioned previously, one end of the rubber tube 37a is connected to the air communicating portion 37, and the other end is connected to the air inlet 37b formed through the power unit cover 51. The cooling air flowing from the air inlet 37b into the power transmitting chamber T is discharged from an air outlet 37c formed through the power unit cover 51 (see FIG. 12).

It will be appreciated from the above description that the muffler body is cooled by the forced flow of cooling air. Accordingly, the muffler body can be located inside the cowl, thereby preventing damage or deformation of the muffler body.

Further, as the tail pipe is located behind the engine at a central lower position of the vehicle body frame, space saving can be realized and stain of the rear fender due to the impingement of exhaust gas can be prevented. Also, as the exhaust pipe is located to pass through the space defined between the engine cooling fan cover and the chain drive sprocket cover, further space saving can be realized.

Moreover, as the main frame is provided with an air communicating portion on the side opposite the muffler body with respect to the main frame, the connection of the air communicating portion can be easily carried out, and a connecting member for the connection can be prevented from being influenced by the heat from the muffler body.

It should be further understood that, although a preferred embodiment of the invention has been illustrated and described herein, changes and modifications can be made in the described arrangement without departing from the scope of the appended claims.

We claim:

1. A motorcycle having a vehicle body frame mounting an engine, a muffler device and a cowl covering the front and side portions of said vehicle body frame, said muffler device comprising a muffler body and an air guide cover fully enclosing said muffler body in spaced relation thereto to define a cooling chamber between said muffler body and said air guide cover, said cooling chamber defining an air flow passage about said muffler body, and means for supplying cooling air under pressure to said air flow passage for forcibly cooling said muffler body, said muffler body and said air guide cover being located within and covered on the top and sides by said cowl.

2. The motorcycle as recited in claim 1 wherein said air guide cover comprises a pair of separable half elements joined for sealingly enclosing said muffler body.

3. The motorcycle as recited in claim 1 in which said motorcycle includes a chain drive having a sprocket for driving said motorcycle, a cooling fan for cooling said engine, an engine fan cover enclosing said engine and said cooling fan, a chain drive sprocket cover located behind said fan cover, and an exhaust pipe connecting said engine to said muffler body, said exhaust pipe extending through a space defined between said engine cooling fan cover and said chain drive sprocket cover.

4. The motorcycle as recited in claim 1 in which said vehicle body frame includes a hollow main frame mounting said muffler body on one longitudinal side thereof, a power unit including said engine and a power transmitting device operatively connected thereto, air induction means formed in said main frame adjacent the front end thereof and air discharge means formed in said main frame adjacent the rear end thereof for conducting cooling air in heat transfer relation to said power transmitting device.

5. The motorcycle as recited in claim 4 in which said air discharge means is disposed on said main frame on the side opposite that mounting said muffler body.

6. The motorcycle as recited in claim 5 which said power transmitting device is of the belt-type.

7. The motorcycle as recited in claim 1 in which said motorcycle includes a seat and a fuel tank disposed forwardly thereof, said fuel tank being disposed no higher than said seat.

8. The motorcycle as recited in claim 7 in which said vehicle body is formed at its front end with a head pipe, said cowl front portion covering said head pipe and said side portions extending continuously from said cowl front portions extending downwardly divergently whereby the upper portion of said cowl front portion extending along said head pipe has a smaller width than that of a lower portion of said front cowl portion.

9. The motorcycle as recited in claim 7 in which said cowl forms a tank cover covering said fuel tank, a cap projecting from an upper portion of said tank cover, and an upwardly projecting cap guard formed at a position between said cap and said seat.

10. The motorcycle of claim 1 wherein the means for supplying cooling air under pressure to an air flow passage for forcibly cooling a muffler body comprises a fan driven by said engine inducing the intake of said cooling air and propelling said cooling air through said air flow passage.

11. A muffler device for a motorcycle having a vehicle body frame mounting an engine, and a cowl covering the front and side portions of said vehicle body frame, said muffler device comprising a muffler body and an air guide cover surrounding said muffler body in spaced relation thereto to define a cooling chamber between said muffler body and said air guide cover, said muffler body and said air guide cover being located within and substantially surrounded by said cowl, said cooling chamber defining an air flow passage about said muffler body, and means for supplying cooling air under pressure to said air flow passage for forcibly cooling said muffler body including a tailpipe projecting from said muffler body and penetrating said air guide cover at a position behind said engine at a central lower portion of said vehicle body frame.

12. The muffler device as recited in claim 11 including a spark arrester mounted on said vehicle body frame and connecting with said tail pipe at the lower end thereof.

13. The muffler device of claim 11 wherein the means for supplying cooling air under pressure to an air flow passage for forcibly cooling a muffler body comprises a fan driven by said engine inducing the intake of said cooling air and propelling said cooling air through said air flow passage.

14. A motorcycle comprising a vehicle body frame, a power unit mounted on said vehicle body frame and including an engine and a power transmitting device operably connected with said engine, said vehicle body frame including a main frame having a hollow interior, air induction means formed adjacent the front end of said main frame and communicating with the interior thereof, air discharge means formed adjacent the rear end of said main frame and being directed to conduct cooling air from the interior of said main frame into heat exchange relation with said power transmitting device, a power unit cover enclosing said power unit and being disposed in spaced relation to said engine and said power transmitting device, means for connecting said air discharge means to said cover for the circulation of cooling air in heat exchange relation with said power transmitting device, a muffler device and a cowl mounted on said vehicle body frame and enclosing said muffler device and said power unit, said muffler device comprising a muffler body and an air guide cover spacedly surrounding said muffler body to define a cooling chamber between said muffler body and said cover for the circulation of cooling air in heat exchange relation with said muffler body, a fan driven by said engine for inducing cooling air into said power unit cover for cooling said engine, and means communicating the interior of said power unit cover with said air guide cover for conducting cooling air from within said power unit cover into said air guide cover.

* * * * *